Aug. 17, 1965 W. M. NUSS 3,201,653

SHIELD

Filed May 4, 1962 3 Sheets-Sheet 1

INVENTOR.
WALTER M. NUSS

BY

W. G. Sprague
ATTORNEY

Aug. 17, 1965 W. M. NUSS 3,201,653

SHIELD

Filed May 4, 1962 3 Sheets-Sheet 2

INVENTOR.
WALTER M. NUSS

BY

W. H. Sprague
ATTORNEY

Aug. 17, 1965

W. M. NUSS

SHIELD 3,201,653

Filed May 4, 1962

3 Sheets-Sheet 3

INVENTOR.
WALTER M. NUSS
BY
W. H. Sprague
ATTORNEY

United States Patent Office 3,201,653
Patented Aug. 17, 1965

3,201,653
SHIELD

Walter M. Nuss, Medford Lakes, N.J., assignor to Radio Corporation of America, a corporation of Delaware Filed May 4, 1962, Ser. No. 192,530
6 Claims. (Cl. 317—99)

This invention relates to a shield for high voltage developing apparatus, and particularly to a hinged structure for shielding a high voltage transformer and for supporting a rectifier tube with its anode cap in electrical connection with a high voltage connector of said transformer.

In known systems for developing the high voltage necessary for application to the final accelerating electrode of a television receiver picture or cathode ray tube, an auto-transformer is provided, a tap on the coil of the auto-transformer being connected to the anode of the horizontal deflection output tube. The horizontal deflection current is taken from a pair of other taps on said coil and applied to the deflection yoke. The voltage developed across the whole coil, after rectification, is applied to the final accelerating electrode of the television receiver picture or cathode ray tube. The transformer and rectifier are usually surrounded by a shield.

It has been proposed to eliminate the lead usually provided between the high voltage auto-transformer terminal and the high voltage rectifier, thereby eliminating any corona discharge and arc-over from such lead. This lead is eliminated by providing a high voltage transformer having its high voltage connector mounted on the periphery thereof, in combination with a rectifier tube so mounted on a portion of the shielding structure, that the anode cap of the rectifier tube contacts the high voltage connector. In one form of such apparatus, the portion of the shield that supports the rectifier is completely detachable, whereby upon detaching this portion of the shield the rectifier may be replaced when necessary. This detachable shield arrangement is inconvenient in that the detachable shield portion is to be supported while the rectifier tube is tested or replaced. Since a short high voltage wire extends from the detachable shield portion to the picture tube, it is usual to lay the detachable shield portion on other components of the television chassis, which may cause these components to be damaged. Also, upon picking up the detachable shield portion, time may be lost in properly orienting it with respect to the remainder of the shield structure for proper fitting therewith. Furthermore, insertion of the cap of the rectifier, which is mounted on the detachable shield portion, into the high voltage connector of the transformer while it is surrounded by the fixed shield portion, is a blind job and requires care.

It is therefore an object of this invention to provide an improved shielding structure for the high voltage transformer and rectifier in which the rectifier is inserted in a socket mounted on a shield portion.

It is an object of this invention to provide a shield for the high voltage transformer and rectifier in which the rectifier is inserted in a socket mounted in a shield portion which is not completely detached from the remainder of the shield.

It is an object of this invention to provide a shield for the high voltage transformer and rectifier in which the shield portion including the socket is supported on the remainder of the shield while the shield is open.

It is an object of this invention to provide such a shield which, in the act of being closed, guides the rectifier cap into the high voltage connector.

An embodiment of this invention comprises a shield including a first shield member which provides shielding in three directions, and which may be fixed to a television chassis to provide shielding in a fourth direction. A second shield member is hingedly and slidably mounted on the first shield member and provides shielding in the remaining two directions, the second shield member carrying a socket for the rectifier tube. The slidable mounting of the second shield member on the first or fixed shield member permits, when opening the shield, sliding the second shield member and the rectifier tube when mounted in the socket, with respect to the fixed shield member and with respect to the transformer mounted therein, until the cap of the rectifier clears the transformer connector, then the second member of the shield is rotated with respect to the first shield member to an open position of rest. Conversely, in closing the shield, the second shield member is rotated from its open position of rest until the cap of the rectifier tube is directed towards the connector of the auto-transformer and then the second shield member is slid until the cap enters the connector and the second member closes the shield.

This invention is more fully explained in the following detailed description thereof taken with the accompanying drawings in which.

Figure 1:
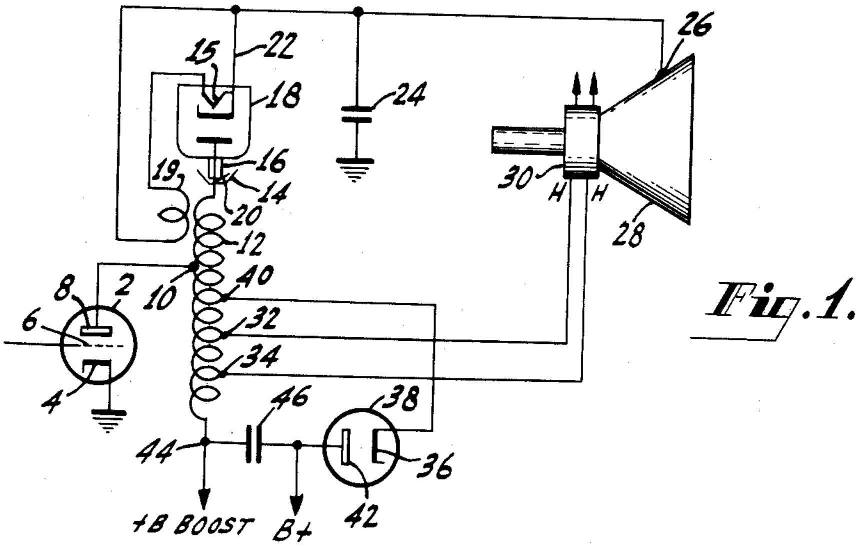
FIG. 1 is a partial circuit diagram of the high voltage system for a television receiver in which the shielding arrangement according to this invention may be used.
Figure 5:
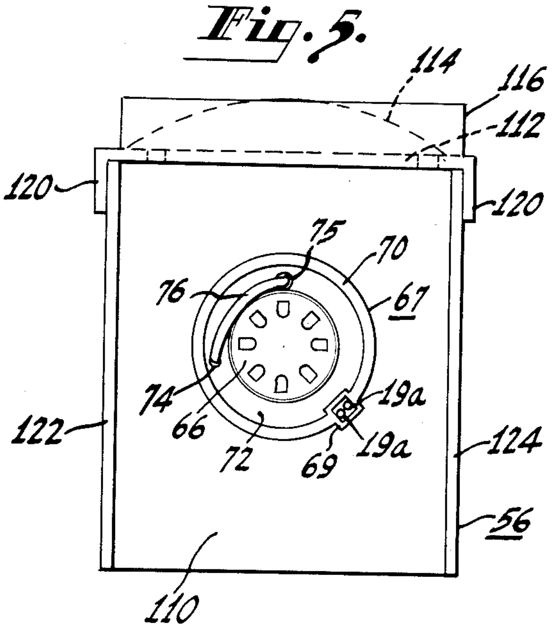
FIG. 5 is a bottom view of the top portion of the shield showing the socket assembly mounted thereon.

Turning first to FIG. 1, a horizontal deflection output tube 2 has its cathode 4 connected to ground, and a suitable sawtooth voltage is applied to the grid 6 thereof. The anode 8 of output tube 2 is connected to a tap 10 on high voltage auto-transformer coil 12. The high voltage end of coil 12 is connected to high voltage terminal 14 and the anode cap 16 of high voltage rectifier 18 contacts terminal 14 either directly, or cap 16 contacts spring wire 20, which are themselves connected to terminal 14, as will be explained. Heater current for the heater 15 of rectifier 18 is supplied from the transformer secondary 19 coupled to coil 12. The base pin 22 of rectifier tube 18 which is connected to the cathode thereof, is connected to high voltage filter capacitor 24, the other terminal of capacitor 24 being connected to ground, the junction of pin 22 and capacitor 24 being connected to the high voltage terminal 26 of cathode ray tube 28. The horizontal winding of deflection yoke 30 is connected between two taps 32 (closer to the high voltage end of coil 12) and 34 (closer to the low voltage end) on coil 12, the taps 32 and 34 being between tap 10 and the low voltage end 44 of coil 12. The cathode 36 of damping tube 38 is connected to a tap 40 on coil 12 between taps 10 and 32 and the anode 42 of damping tube 38 is connected to the low potential end 44 of coil 12 through +B-boost capacitor 46. B+ voltage may be applied to the junction of anode 42 and capacitor 46, and +B-boost voltage may be taken from the end 44 of coil 12.

The above-described circuit as thus far described is known and its operation understood. FIGS. 2–5 are referred to for the descriptions of the herein disclosed shielding structure.

Figures 2, 3:
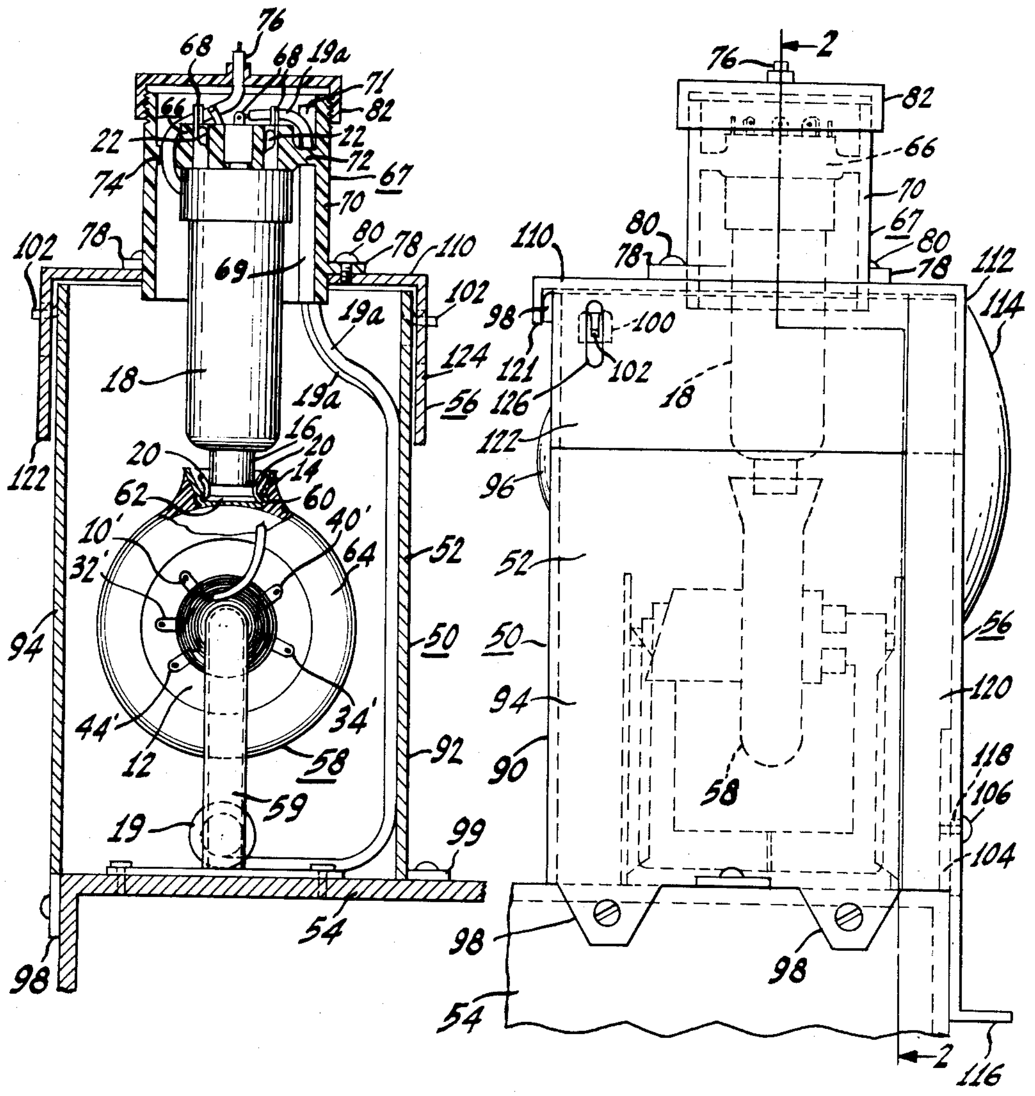
FIG. 2 is a front elevation, in section on line 2—2 of FIG. 3 of the herein disclosed shield and showing the relative arrangement of the high voltage transformer and the rectifier tube and its socket.
FIG. 3 is a side elevation of the shield in closed position.

Referring to FIG. 2, a shield generally indicated as 50, is provided. The shield 50 comprises a metallic shield member 52 which is in the form of a channel, whereby it provides shielding for apparatus mounted therein in three directions, namely, left side, right side, and back as viewed in FIG. 2. The shield member 52 may be mounted on television metallic chassis 54 to provide shielding in a fourth direction, that is, down. A cover or top metallic shield member 56 is hingedly and slidably mounted in a manner to be described on shield member 52 to provide shielding in the two remaining directions, namely, front and upwards. A high voltage transformer 58, having an end connector 44′ and tap connectors 34′, 32′, 40′ and 10′, is mounted by means of transformer frame 59 within shield 50 on chassis 54 as by means of screws. The connectors 10′, 40′, 32′, 34′ and 44′ correspond to points 10, 40, 32, 34 and 44 respectively of coil 12 shown in FIG. 1. The cup-shaped high voltage connector 14 is mounted on the periphery of coil 12 and is of funnel shape, having groove 60 to receive a spring ring 62, the ends 20 of the rings 62 being bent out of the plane of the remainder of spring ring 62. Ring 62 is mounted in groove 60 in such manner that the spring ends 20 extend away from coil 12. The cup-shaped connector 14 is connected to the high voltage end of coil 12 and is mounted on the insulated outer layer of windings of coil 12 in any convenient manner. The insulation comprising the corona ring 64 is molded about the periphery of coil 12 and about most of the outside of connector 14, leaving the inside thereof uninsulated. Rectifier heater supply is obtained from coil 19 mounted on a portion of the transformer core. Further description of the high voltage transformer does not appear to be necessary since a description of the details thereof are not needed for an understanding of this invention.

The rectifier tube 18, having an anode cap 16 is mounted in plastic socket 66, which is a portion of a plastic socket assembly 67. The socket assembly 67 is mounted in a hole through shield member 56, as will be explained. The pin-receiving holes of socket 66 are so directed that when the shield is closed the pin-receiving holes are inwardly directed, that is, the holes open towards the high voltage connector 14. The cap 16, when the rectifier 18 in its operating position, is in contact with connector 14 or with the spring fingers 20 which are themselves in contact with connector 14. The base pins 22 of tube 18 extend into socket 66 and into contact with connectors 68 of socket 66.

The socket 66 is integrally fixed to a plastic sleeve 70, which is also part of socket assembly 67, as by plastic bridge material 72, a pair of holes 74 and 75 (FIGS. 2 and 5) being provided through the bridge 72 to anchor the high voltage lead 76 with respect to socket 66. The sleeve 70 is formed with a rectangular shaped tubular portion 69 running parallel to the length of the sleeve 70 through which rectifier heater supply wires 19*a*, 19*a* are strung. The wires 19*a* extend out of opening 71 (FIG. 2) and are connected to the connectors 68 for the heater of the rectifier tube 18. The sleeve 70 extends through shield member 56 and a pair of lugs 78 which are integral with sleeves 70 are provided for fixing sleeve 70 and therefore socket 66 with respect to shield member 56 as by rivets 80. A plastic cap 82, which is a further part of the socket assembly 67, is provided to cover the exposed backside of socket 66. High voltage wire 76 extends through a hole in cap 82, for connection to high voltage terminal 26 of cathode ray tube 28. Cap 82 may be fixed to sleeve 70 as by a threaded engagement therewith.

The shield 50 itself, as previously stated comprises a channel-shaped member 52 (FIGS. 2–4) and a top shield members 56 (FIGS. 2–5). The channel-shaped member 52 has an end or back wall 90 and two side walls 92 and 94, all of substantially the same length. A partially spherical bulge 96 (FIG. 3) is provided in the back wall 90 near the top thereof for a purpose to be described. The top of back wall 90 is reinforced as by turning down a portion of the sheet material from which the channel-shaped member 52 may be made to form reinforcing bar 98. One side wall 94 (the left one) has two lugs 98 extending downward therefrom for fixing channel member 52 to the side of a chassis 54 as by screws. The other end wall 92 has an outturned lug 99 (FIG. 2) for fixing to the top of chassis 54. A U-shaped slot 100 is formed in each side wall 92 and 94 near the top thereof and near the back 90 whereby tongues 102 are provided. As will be described, tongues 102 are turned outwardly to act as hinge pins for hingedly mounting shield member 56 on shield member 52. Turned-in lug portions 104 are also provided near the bottom end of each side wall 92 and 94 for fixing the top member 56 to shield member 52 when in closed position as will be explained. While only one U-shaped slot 100 in left side wall 94 and only one in-turned lug 104 and one screw 106 is shown in the drawing, (See FIG. 3), it will be understod that a respectively similar U-shaped slot 100 and turned-in flange 104 is provided for right wall 92 and that a further screw 106 is provided to hold top member 56 in position on fixed shield member 52.

The top shield member 56 is of a size to fit fairly closely over shield member 52. Top member 56 includes an upper plate 110, in a hole in which the above-described socket assembly 67 is mounted. Top member 56 is provided with a downwardly turned front plate 112. The front plate 112 has a bulge 114 of partial spherical shape near the top thereof, and the bottom end of front plate 112 is provided with an outturned edge 116. Slots 118, only one of which is shown, are provided in front plate 112 in registry with the in-turned lugs 104, and the screws 106 extend through slots 118 and through holes in lug 104. The in-turned flanges 120, only one of which is shown, of front plate 112 embrace the side walls 92 and 94. While front plate 112 is longer than fixed shield member 52, in-turned flanges 120 are only about the length of the side walls 92 and 94 of channel member 52.

Top shield member 56 also includes a relatively short back member 121 which is bent down from top plate 110. Back member 121 is longer than the width of reinforcing bar 98. The back member 121 is not reinforced and may be bent back and forth to fix it in a desired position. The upper plate 110 has two depending sides 122 and 124 which are longer than back portion 121. A slot 126, running perpendicular to top 110, is formed in each side 122 and 124 near the back 121, and each slot 126 extends for nearly the length of depending sides 122 and 124. Only one slot 126 is shown. These slots 126 are so positioned that when top member 56 is placed on shield member 52, bent out tongues 102 extend through slots 126. In this manner, top member 56 can slide up and down with respect to member 52 and when top member 56 has been moved up far enough with respect to fixed member 52 so that back 121 does not interfere, top member may be rotated counterclockwise, as viewed in FIGS. 3 and 4, about tongues 102 to the position shown in solid lines in FIG. 4. Side members 122 and 124 and in-turned flanges 120 overlap in part as shown in the drawings and the overlapping portions may be soldered or welded together to provide reinforcement.

Figure 4:
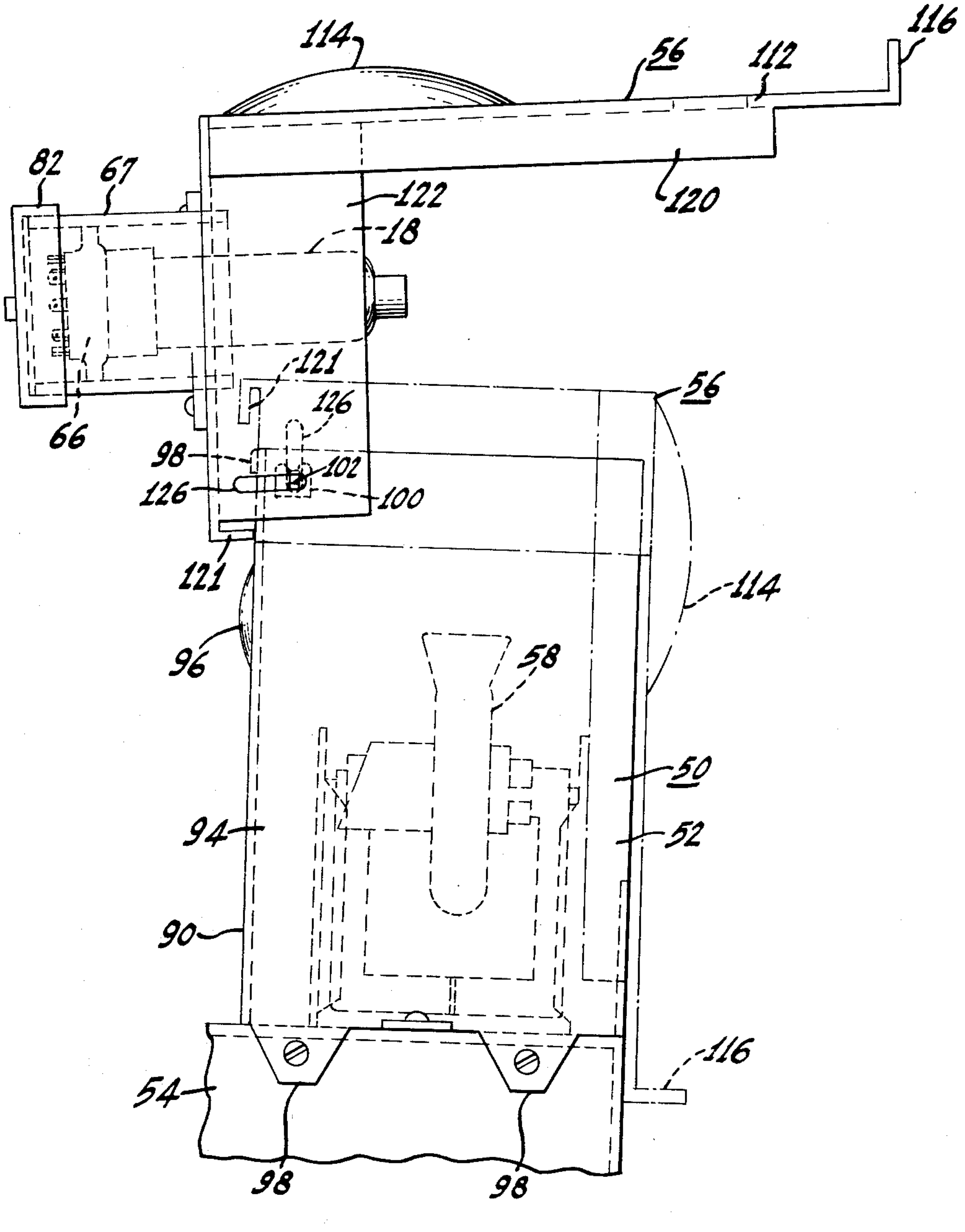
FIG. 4 is a side elevation of the shield in open position and also showing, in phantom, an intermediate position of the shield members.

FIG. 4 shows the shield members 52 and 56 in their open position, and in dotted lines, FIG. 4 shows an intermediate position of the top shield member 56 reached before rotating top member 56 about lugs 102. In assembling top member 56 on the fixed member 52, top member 56 is placed down over fixed member 52 with the back 121 outside of and in contact with reinforcing bar 98, and with the front plate 112 of top member 56 closing the open side of fixed member 52. In this position, as noted above, the tongues 102 will register with slots 126. These tongues 102 are bent out to form hinge pins (as noted above) whereby top shield member 56 is slidably and hingedly mounted on fixed member 52. In the closed position of the shield, the uninsulated contact 16 and the uninsulated portion of connector 14 are located more or less centrally of the sphere comprising spherical portions 96 and 114. Arc-over distances from these uninsulated contacts are thereby increased over shields without spherical portions 96 and 114.

To open the shield, screws 106 are removed, shield member 56 is moved up to the position shown in dotted lines in FIG. 4. The heater supply wires 19*a*, 19*a*, which run from transformer secondary 19 inside of and along the side of shield cage 50 and through rectangular channel 69, are long enough to permit opening the shield. At this position, hinge pins 102 contact the lower ends of slots 126 and anode cap 16 of tube 18 has been pulled out of high voltage connector 14. Back 121 of top member 56 is raised far enough with respect to fixed shield member 52 so as to permit hinging of top member 56 with respect to fixed lower member 52. The top member 56 may then be hinged back until the center of gravity of top shield member 56 is back beyond the end wall 90 of lower shield member 52. In this position, back 121 contacts wall 90 and prevents top member 56 from rotating further in a counter-clockwise direction (as viewed in FIG. 4) with respect to lower shield member 52. If necessary, back 121 may be bent forward or back to permit further or less counter-clockwise hinging of member 56 with respect to member 52.

In this open position of the shield, rectifier tube 18 may be removed for testing or replacement and the transformer 58 is accessible for repairs, while shield members 52 and 56 remain in their open position. A rectifier tube 18 may be put into socket 66 and, to close the shield, top member 56 may be turned clockwise until the shield members 52 and 56 take the position shown in dotted lines in FIG. 4, the tongues 102 being near the lower ends of slots 126. Then shield member 56 may be slid straight down to the closed position shown in FIG. 3 in which cap 16 of rectifier 18 will enter connector 14 of transformer 58. This slidable feature of the top shield member 56 provides accommodation for any variation in the length of the rectifier tube or height of the transformer. The screws 106 are inserted through slots 118 in plate 112 and are extended into holes in flanges 104 to retain shield member 56 in its closed position. The bent-over flange portion 116 of shield member 56 will then be in a position where it will permit connection of supply voltage to the television receiver.

What is claimed is:

1. In a television receiver including (1) a cathode ray tube and (2) a transformer having a high voltage winding, and a high voltage output terminal comprising a female connector mounted on the periphery of said winding and dimensioned to permit electrical contact-establishing reception of a rectifier tube anode cap therein, said receiver further including (3) means, comprising (a) a high voltage rectifier tube having a cathode electrode connected to a pin in the base thereof and an anode electrode connected to a conductive cap at the end of said tube remote from said base, (b) a rectifier tube socket having a sleeve for receiving said cathode base pin, and (c) a high voltage lead connected to said cathode base pin receiving sleeve, for delivering an accelerating voltage to said cathode-ray tube when said transformer is energized and contact is established between said anode cap and said transformer output terminal, and (4) a shielding arrangement for said transformer;

the improvement wherein said shielding arrangement comprises the combination of:

a first shield member partially enclosing said transformer but having an opening providing access to said transformer;

a second shield member serving as both an adjustable closure for the opening in said first shield member and as a support for said rectifier tube socket, and being dimensioned such that, when said second shield member is in a position substantially fully closing said opening in said first shield member, the anode cap of a rectifier tube mounted in said socket is received in said transformer output terminal in electrical contact-establishing relationship;

said first and second shield members being provided with mechanically cooperating means for permitting restricted movements of said second shield member relative to said first shield member, said restricted movements including (A) a sliding motion of said second shield member relative to said first shield member permitting adjustment of said closure between said position substantially fully closing said opening and a partially closing position whereat said anode cap is disengaged from said transformer output terminal and electrical contact therebetween is broken, and (B) a rotating motion of said second shield member relative to said first shield member permitting adjustment of said closure between said partially closing position and a substantially fully open position providing access to said transformer and said rectifier tube socket from the exterior of said first shield member.

2. In a television receiver including (1) a cathode ray tube and (2) a transformer having a high voltage winding, and a high voltage output terminal comprising a female connector mounted on the periphery of said winding and dimensioned to permit electrical contact-establishing reception of a rectifier tube anode cap therein, said receiver further including (3) means, comprising (a) a high voltage rectifier tube having a cathode electrode connected to a pin in the base thereof and an anode electrode connected to a conductive cap at the end of said tube remote from said base, (b) a rectifier tube socket having a sleeve for receiving said cathode base pin, and (c) a high voltage lead connected to said cathode base pin receiving sleeve, for delivering an accelerating voltage to said cathode-ray tube when said transformer is energized and contact is established between said anode cap and said transformer output terminal, and (4) a shielding arrangement for said transformer;

the improvement wherein said shielding arrangement comprises the combination of:

a first shield member partially enclosing said transformer but having an opening providing access to said transformer;

a second shield member serving as both an adjustable closure for the opening in said first shield member and as a support for said rectifier tube socket, and being dimensioned such that, when said second shield member is in a position substantially fully closing said opening in said first shield member, the anode cap of a rectifier tube mounted in said socket is received in said transformer output terminal in electrical contact-establishing relationship;

said first and second shield members being provided with mechanically cooperating means for permitting restricted movements of said second shield member relative to said first shield member, said restricted movements including (A) a sliding motion of said second shield member relative to said first shield member permitting adjustment of said closure between said position substantially fully closing said opening and a partially closing position whereat said anode cap is disengaged from said transformer output terminal and electrical contact therebetween is broken, and (B) a rotating motion of said second shield member relative to said first shield member permitting adjustment of said closure between said partially closing position and a substantially fully open position providing access to said transformer and said rectifier tube socket from the exterior of said first shield member;

said cooperating means for permitting restricted shield member movements including a slot in said second shield member, and a hinge pin extending from said first shield member through said slot.

3. In a television receiver including (1) a cathode ray tube and (2) a transformer having a high voltage winding, and a high voltage output terminal comprising a female connector mounted on the periphery of said winding and dimensioned to permit electrical contact-establishing reception of a rectifier tube anode cap therein, said receiver further including (3) means, comprising (a) a high voltage rectifier tube having a cathode electrode connected to a pin in the base thereof and an anode electrode connected to a conductive cap at the end of said tube remote from said base, (b) a rectifier tube socket having a sleeve for receiving said cathode base pin, and (c) a high voltage lead connected to said cathode base pin receiving sleeve, for delivering an accelerating voltage to said cathode ray tube when said transformer is energized and contact is established between said anode cap and said transformer output terminal, and (4) a shielding arrangement for said transformer;

the improvement wherein said shielding arrangement comprises the combination of;

a first shield member partially enclosing said transformer but having an opening providing access to said transformer;

a second shield member serving as both an adjustable closure for the opening in said first shield member and as a support for said rectifier tube socket, and being dimensioned such that, when said second shield member is in a position substantially fully closing said opening in said first shield member, the anode cap of a rectifier tube mounted in said socket is received in said transformer output terminal in electrical contact-establishing relationship;

said first and second shield members being provided with mechanically cooperating means for permitting restricted movements of said second shield member relative to said first shield member, said restricted movements including (A) a sliding motion of said second shield member relative to said first shield member permitting adjustment of said closure between said position substantially fully closing said opening and a partially closing position whereat said anode cap is disengaged from said transformer output terminal and electrical contact therebetween is broken, and (B) a rotating motion of said second shield member relative to said first shield member permitting adjustment of said closure between said partially closing position and a substantially fully open position providing access to said transformer and said rectifier tube socket from the exterior of said first shield member;

said second shield member incorporating means subject to engagement with said first shield member for precluding rotational movement of said shield member relative to said first shield member when said second shield member is in a position establishing contact between said anode cap and said transformer terminal;

said last-named means also serving to limit the rotational movement of said second shield member relative to said first shield member at said substantially fully open position.

4. In a television receiver including (1) a cathode ray tube and (2) a transformer having a high voltage winding, and a high voltage output terminal comprising a female connector mounted on the periphery of said winding and dimensioned to permit electrical contact-establishing reception of a rectifier tube anode cap therein, said receiver further including (3) means, comprising (a) a high voltage rectifier tube having a cathode electrode connected to a pin in the base thereof and an anode electrode connected to a conductive cap at the end of said tube remote from said base, (b) a rectifier tube socket having a sleeve for receiving said cathode base pin, and (c) a high voltage lead connected to said cathode base pin receiving sleeve, for delivering an accelerating voltage to said cathode-ray tube when said transformer is energized and contact is established between said anode cap and said transformer output terminal, and (4) a shielding arrangement for said transformer;

the improvement wherein said shielding arrangement comprises the combination of:

a first shield member partially enclosing said transformer but having an opening providing access to said transformer;

a second shield member serving as both an adjustable closure for the opening in said first shield member and as a support for said rectifier tube socket, and being dimensioned such that, when said second shield member is in a position substantially fully closing said opening in said first shield member, the anode cap of a rectifier tube mounted in said socket is rereceived in said transformer output terminal in electrical contact-establishing relationship;

said first and second shield members being provided with mechanically cooperating means for permitting restricted movements of said second shield member relative to said first shield member, said restricted movements including (A) a sliding motion of said second shield member relative to said first shield member permitting adjustment of said closure between said position substantially fully closing said opening and a partially closing position whereat said anode cap is disengaged from said transformer output terminal and electrical contact therebetween is broken, and (B) a rotating motion of said second shield member relative to said first shield member permitting adjustment of said closure between said partially closing position and a substantially fully open position providing access to said transformer and said rectifier tube socket from the exterior of said first shield member;

said first shield member being channel shaped and having an end wall and two side walls;

said second shield member comprising a top portion and respective flanges extending from two sides of said top portion, a front wall extending from a third side thereof, and a further flange extending from a fourth side of said top portion, said further flange being shorter than said two side flanges;

said cooperating means for permitting restricted shield member movements including respective slots in the side flanges of said second shield member, and respective hinge pins extending from the side walls of said first shield member through respective ones of said slots;

engagement of said further flange with the end wall of said first shield member precluding rotational movement of said second shield member relative to said first shield member when said second shield member is in a position establishing contact between said anode cap and said transformer terminal, and engagement of said end wall by said further flange also serving to limit the rotational movement of said second shield member relative to said first shield member at said substantially fully open position.

5. In electrical equipment including, in combination, an electron tube having pin connectors in the base thereof and an additional connector at the end of said tube remote from said base, a source of energy having an output terminal, said tube serving to process the energy output of said source when contact is established between said additional connector and said source output terminal, and a shielding arrangement for said source;

the improvement wherein said shielding arrangement comprises the combination of:

a first shield member partially enclosing said source but having an opening providing access to said source;

a second shield member serving as both an adjustable closure for the opening in said first shield member and as a support for a socket receiving the base pins of said tube, and being dimensioned such that, when said second shield member is in a position substantially fully closing said opening in said first shield member, said additional connector of said tube establishes contact with said output terminal;

said first and second shield members being provided with mechanically cooperating means for permitting restricted movements of said second shield member relative to said first shield member, said restricted movements incuding (1) a sliding motion of said second shield member relative to said first shield member, permitting adjustment of said closure between said position substantially fully closing said opening and a partially closing position whereat contact between said additional connector and said output terminal is dis-established, and (2) a rotating motion of said second shield member relative to said first shield member, permitting adjustment of said closure between said partially closing position and a substantially fully open position providing access to said source and tube socket from the exterior of said first shield member.

6. In electrical equipment in combination, an electron tube having pin connectors in the base thereof and additional connector at the end of said tube remote from said base, a source of energy having an output terminal, said tube serving to process the energy output of said source when contact is established between said additional connector and said source output terminal, and a shielding arrangement for said source;

the improvement wherein said shielding arrangement comprises the combination of:

a first shield member partially enclosing said source but having an opening providing access to said source;

a second shield member serving as both an adjustable closure for the opening in said first shield member and as a support for a socket receiving the base pins of said tube, and being dimensioned such that, when said second shield member is in a position substantially fully closing said opening in said first shield member, said additional connector of said tube establishes contact with said output terminal;

said first and second shield members being provided with mechanically cooperating means for permitting restricted movements of said second shield member relative to said first shield member, said restricted movements including (1) a sliding motion of said second shield member relative to said first shield member permitting adjustment of said closure between said position substantially fully closing said opening and a partially closing position whereat contact between said additional and said output terminal is disestablished, and (2) a rotating motion of said second shield member relative to said first shield member permitting adjustment of said closure between said partially closing position and a substantially fully open position providing access to said source and tube socket from the exterior of said first shield member;

said second shield member including means subject to engagement with said first shield member for precluding rotational motion of said second shield member relative to said first shield member when said second shield member is in a position establishing contact between said additional connector and said output terminal.

References Cited by the Examiner

UNITED STATES PATENTS

| | | | |
|---|---|---|---|
| 2,022,644 | 12/35 | Ashcraft | 317—100 |
| 2,071,867 | 2/37 | Tomita | 220—38 |
| 2,428,948 | 10/47 | Torsch et al. | 336—107 |
| 2,549,366 | 4/51 | Bostick | 336—105 |

DARRELL L. CLAY, *Primary Examiner.*

JOHN F. BURNS, *Examiner.*